Charles B. Pettengill.
Reversible or Side Hill Plow.

No. 118,049 — Patented Aug. 15 1871

Witnesses:
E. Wolff
Wm. H. C. Smith

Inventor:
Charles B. Pettengill
per
Attorneys.

UNITED STATES PATENT OFFICE.

CHARLES B. PETTENGILL, OF HEBRON, MAINE.

IMPROVEMENT IN REVERSIBLE SIDE-HILL PLOWS.

Specification forming part of Letters Patent No. 118,049, dated August 15, 1871.

*To all whom it may concern:*

Be it known that I, CHARLES B. PETTENGILL, of Hebron, in the county of Oxford and State of Maine, have invented a new and useful Improvement in Reversible or Side-Hill Plow; and I do hereby declare that the following is a full, clear, and exact description thereof, which will enable others skilled in the art to make and use the same, reference being had to the accompanying drawing forming part of this specification, in which—

Figure 1:
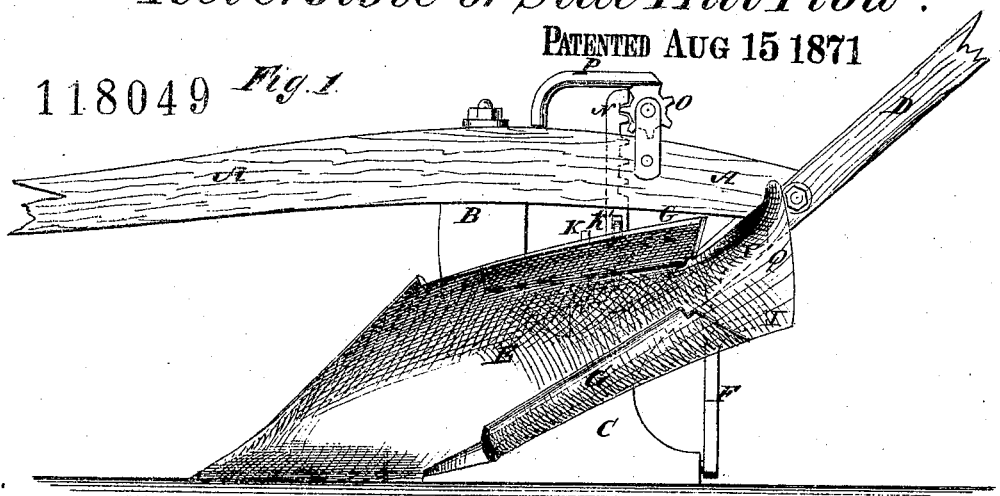
Figure 2:
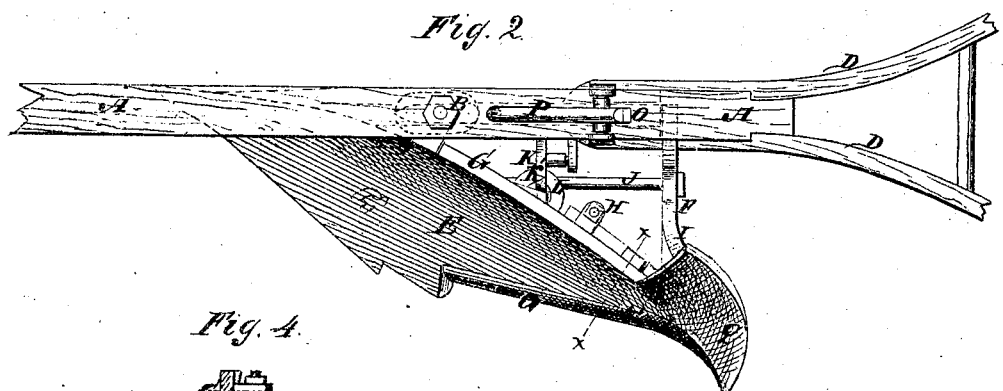
Figure 4:
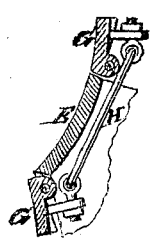
Figure 3:
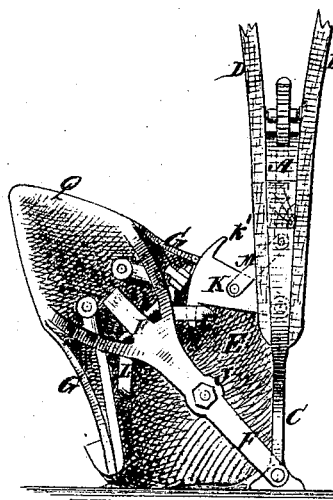

Figure 1 is a view of the mold-board side of my improved plow. Fig. 2 is a top view of the same. Fig. 3 is a rear view of the same. Fig. 4 is a detail sectional view of the same taken through the line $x\,x$, Fig. 2.

Similar letters of reference indicate corresponding parts.

My invention has for its object to furnish an improved reversible plow which shall be so constructed and arranged as to turn a furrow equally as well upon level as upon inclined land, and which shall at the same time be simple in construction, easily and conveniently reversed, and firmly held while at work; and it consists in the construction and combination of various parts of the plow, as hereinafter more fully described.

A is the plow-beam, to which the standard B of the land-side C is attached in the ordinary manner. To the rear end of the beam A are attached the handles D, the rear ends of which are attached to the rear part of the land-side C. E is the mold-board, the forward part of which is pivoted to the forward end of the base of the land-side C, in the ordinary manner. Upon the inner side of the rear part of the mold-board E is cast or to it is attached a loop to receive the hook formed upon the outer end of the arm F, the inner end of which is pivoted to the rear end of the base of the land-side C, so that the mold-board E may be reversed or changed from one side of the beam A to the other, according as a right or left-hand furrow is to be turned. G are wings, which are placed in recesses in the edges of the rear part of the mold-board E, and are pivoted at their front and rear ends to the said mold-board. The wings G are connected by a jointed rod, H, so that when the upper wing G is pushed outward the lower wing G may be drawn inward, thus bringing them into proper position for turning the furrow. Upon the bar F, near its outer end, are formed branches or arms I, the outer ends of which are inclined to the rearward, and rest against ribs or shoulders formed upon the inner side of the edges of the rear part of the mold-board E. The outer ends of the arms I are so formed that the rear end of the lower wing G may always rest upon one of said arms, and be supported against the inward pressure of the soil. The bar F is held firmly to its place by the rod J, which has a hook formed upon its forward end to hook into a loop cast upon or attached to the forward part of the inner side of the mold-board E. The rear end of the rod J passes through the middle part of the bar F, and has a screw-thread formed upon it to receive the nut by which it is secured. K is a catch, the inner end of which is pivoted to the upper edge of the land-side C. The outer end of the catch K is rounded off so that, when turned down upon either side, it may push out the upper wing G and support it in proper position. Upon the upper and lower edges of the outer end of the catch K are formed hooks or prongs K′, which drop into loops L upon or attached to the inner side of the mold-board E, near its side edges, so that the said catch may hold the mold-board firmly in place while at work. M is a connecting-rod, the lower end of which is pivoted to the middle part of the catch K, and its upper end is pivoted to the lower end of the toothed rack N, which passes up through a guide-slot formed for its reception in the beam A. Into the teeth of the rack-bar N mesh the teeth of the segmental gear-wheel O, which is pivoted to the top of the beam A, and upon it is formed or to it is rigidly attached a handle or lever, P. By this construction, when the plow is to be reversed a quick movement of the lever P will detach the catch K and throw it past the center of the beam, so that, when the lever is dropped or moved to its former position, the said catch will drop into position to push back the other wing G, and catch upon the other loop L as the mold-board E comes into its reversed position. Upon the rear end of the reversible mold-board E is formed a projection, Q, somewhat similar in form to a shovel-plow, and the effect of which, in connection with the wings G, is to cause the plow to turn a furrow properly, even upon level ground, the inability to do which is a great objection to the reversible plows heretofore made.

Having thus described my invention, I claim as new and desire to secure by Letters Patent—

1. In combination with two hinged wings, G G, attached to a reversible mold-board, the jointed rod H passing behind the mold-board, the effect being to compel each wing to move inward as the other moves outward.

2. In combination with hinged wings, G G, on the mold-board, the pivoted catch K curved on its outer surface, the effect being to move out and support the wings.

3. The combination of a mold-board, E, having projection Q, and a pair of wings, G G, all constructed and arranged as described, the effect being to enable the same plow to work on level ground as well as on a hill-side.

4. The rod M, toothed bar N, pinion O, and lever P combined with a catch, K K', to operate it in the manner and for the purpose described.

CHARLES B. PETTENGILL.

Witnesses:
ELISHA F. STONE,
GEORGE A. WILSON.